(12) United States Patent
Watt et al.

(10) Patent No.: US 10,999,403 B2
(45) Date of Patent: May 4, 2021

(54) COMPOSABLE INFRASTRUCTURE PROVISIONING AND BALANCING

(71) Applicant: Red Hat, Inc., Raleigh, NC (US)

(72) Inventors: Stephen Watt, Austin, TX (US); Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/586,382

(22) Filed: Sep. 27, 2019

(65) Prior Publication Data

US 2021/0099542 A1   Apr. 1, 2021

(51) Int. Cl.
*H04L 29/08*   (2006.01)
*H04L 12/26*   (2006.01)
*H04L 12/24*   (2006.01)

(52) U.S. Cl.
CPC ........ *H04L 67/32* (2013.01); *H04L 29/08171* (2013.01); *H04L 41/0806* (2013.01); *H04L 41/0836* (2013.01); *H04L 41/0886* (2013.01); *H04L 41/5054* (2013.01); *H04L 43/0852* (2013.01); *H04L 67/1029* (2013.01); *H04L 67/10* (2013.01)

(58) Field of Classification Search
CPC ... H04L 29/08135–08288; H04L 41/08–0806; H04L 41/0823–0836; H04L 41/0876–0893; H04L 41/14–16; H04L 41/22; H04L 41/5041–5054; H04L 41/5096; H04L 67/10; H04L 67/1002–1036; G06F 9/45533–45558; G06F 9/50–5088; G06F 2009/45575
See application file for complete search history.

(56) References Cited

U.S. PATENT DOCUMENTS

| 7,937,705 | B1 * | 5/2011 | Prael .................... G06F 9/50 718/102 |
| 9,256,452 | B1 * | 2/2016 | Suryanarayanan .................... G06F 9/45558 |
| 10,673,935 | B2 * | 6/2020 | Son .................... G06F 9/46 |
| 2012/0159507 | A1 * | 6/2012 | Kwon .................... G06F 9/5088 718/104 |
| 2013/0227585 | A1 * | 8/2013 | Ichikawa .................... G06F 9/4881 718/104 |
| 2014/0019613 | A1 * | 1/2014 | Ishikawa .................... G06F 11/3442 709/224 |

(Continued)

FOREIGN PATENT DOCUMENTS

WO   2019045929 A1   7/2019

OTHER PUBLICATIONS

Kubernetes—Production-Grade Container Orchestration; kubernetes6.rssing.com/chan-42582830/a11_p8.html; retrieved Jun. 5, 2019; pp. 1-84.

*Primary Examiner* — Brendan Y Higa
(74) *Attorney, Agent, or Firm* — K&L Gates LLP

(57) ABSTRACT

Systems and methods for provisioning system components to execute jobs are provided. In one embodiment, receiving a request to provision system components of computing units for executing a job. An aggregate latency may be calculated for each of the computing units based on a startup latency for each job executing on the computing units. A computing unit with a lowest aggregate latency may be identified, and system components may be provisioned from the computing unit with the lowest aggregate latency.

20 Claims, 8 Drawing Sheets

(56) References Cited

U.S. PATENT DOCUMENTS

| | | | |
|---|---|---|---|
| 2014/0115592 A1* | 4/2014 | Frean | G06F 9/4818 718/102 |
| 2015/0089510 A1* | 3/2015 | Kozakai | G06F 9/5077 718/103 |
| 2016/0085587 A1* | 3/2016 | Dube | G06F 9/5005 718/104 |
| 2017/0123855 A1* | 5/2017 | Li | G06F 9/5055 |
| 2020/0074323 A1* | 3/2020 | Martin | G06F 9/5061 |
| 2020/0326980 A1* | 10/2020 | Prantner | G06F 9/4887 |

\* cited by examiner

Job Availability Time Table 174

Computing Unit 128
Job 130: 50 ms
Job 132: 300 ms

Computing Unit 138
Job 140: 70 ms
Job 142: 150 ms
Job 144: 100 ms

Computing Unit 150
Job 152: 90 ms
Job 154: 165 ms
Job 156: 200 ms

Network Connection Time Table 176

Computing Unit 128
Job 132: 150 ms

Computing Unit 138
Job 142: 50 ms

Computing Unit 150
Job 154: 85 ms
Job 156: 70 ms

300

FIG. 3 a# COMPOSABLE INFRASTRUCTURE PROVISIONING AND BALANCING

BACKGROUND

Computing systems may rely on agile computing environments to execute one or more programs and/or computing services. Agile computing environments may provide computing resources that can be used by the computing systems to execute the programs and/or computing services. In particular, the agile computing environments may allocate a portion of the computing resources to execute requested programs and/or computing services.

SUMMARY

The present disclosure presents new and innovative systems and methods for provisioning system components to execute jobs. In one embodiment, a method is provided that includes receiving a request to provision one or more system components for execution of a job and calculating an aggregate latency of a plurality of computing units. To calculate the aggregate latency for each computing unit of the plurality of computing units, the method includes calculating a startup latency for each job executing on the computing unit and adding together the startup latencies for each job executing on the computing unit to determine the aggregate latency of the computing unit. The method also include identifying a computing unit with the lowest aggregate latency from among the plurality of computing units and provisioning system components from the computing unit with the lowest aggregate latency.

In another embodiment, a system is provided including a processor and a memory. The memory stores instructions which, when executed by the processor, cause the processor to receive a request to provision one or more system components for execution of a job calculate an aggregate latency of a plurality of computing units. To calculate the aggregate latency for each computing unit of the plurality of computing units, the processor may calculate a startup latency for each job executing on the computing unit and add together the startup latency for each job executing on the computing unit to determine the aggregate latency of the computing unit. The memory stores further instructions which, when executed by the processor, cause the processor to identify a computing unit with the lowest aggregate latency from among the plurality of computing units and provision system components from the computing unit with the lowest aggregate latency.

In a further embodiment, a method is provided that includes receiving a request to provision system resources for execution of a job and collecting load metrics specifying at least a time to job availability for jobs executing on a plurality of computing units. The method may further include calculating an aggregate latency of the plurality of computing units based on the load metrics and identifying a lowest latency computing unit with the lowest aggregate latency from among the plurality of computing units. The method may still further include provisioning system components from the lowest latency computing unit.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

BRIEF DESCRIPTION OF THE FIGURES

FIG. 3 illustrates time tables according to an exemplary embodiment of the present disclosure.

DETAILED DESCRIPTION OF EXAMPLE EMBODIMENTS

Figure 1:
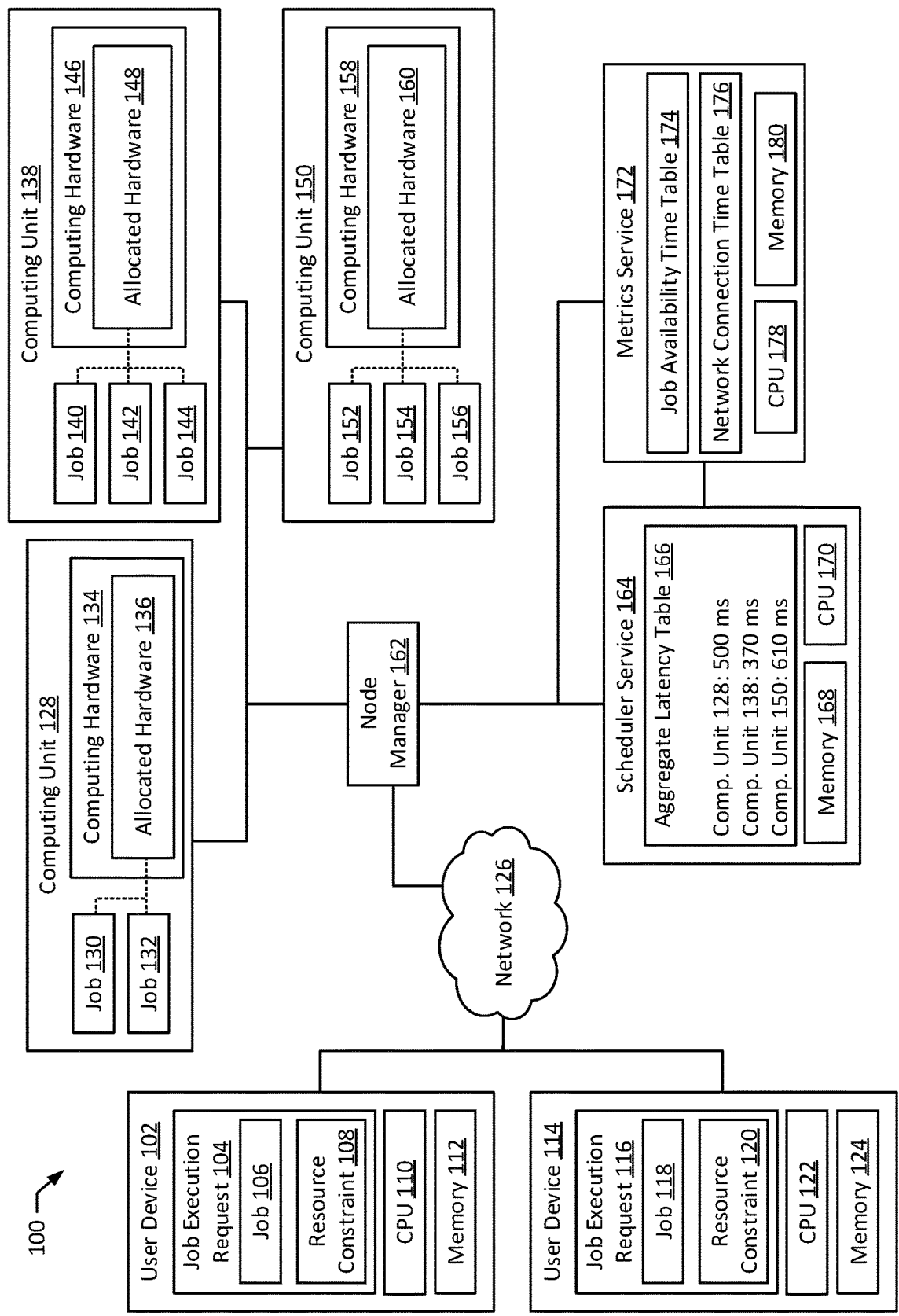
FIG. 1 illustrates a system according to an exemplary embodiment of the present disclosure.

Computing environments such as agile computing environments that provide computing resources to other computing systems (e.g., by a cloud computing infrastructure) typically include multiple computing units with associated computing resources, such as processors, memory, hard disks, and/or graphical processing units. The computing environments may provision the computing resources from among the computing units to computing systems requesting execution of jobs associated with the requesting computing systems. To allocate the computing resources, the computing environments typically rely on virtualization. Virtualizing the computing resources may abstract away the specific computing unit and/or specific piece or portion of computing hardware that a requesting computing system is allocated. Virtualization may also allow jobs to be split up between multiple pieces of hardware (e.g., multiple processors, multiple processor cores, multiple memories). Further, the jobs may also be split up between computing hardware on different computing units. Overall, virtualization may allow computing environments to increase overall resource utilization among the computing units while also reducing the complexity for requesting computing systems, which do not have to configure the specific computing resources allocated for execution of jobs.

However, virtualizing computing resources can reduce overall job execution speed and may reduce fault tolerance for the computing environment. First, virtualized computing resources typically execute jobs slower, as fewer overall computing resources of the computing units are available for job execution. In particular, virtualization of computing resources requires a certain level of computing overhead to run and support the virtualization system, which reduces the overall availability and increase latency of the computing resources of the computing units. Second, virtualization increases the susceptibility of the overall computing environment to crashes resulting from hardware faults or failures. In particular, because jobs executing on virtualized computing hardware can be spread out among computing resources on multiple computing units, failure of one of the computing units of a given computing environment may compromise and/or crash all computing units in the computing environment, requiring a reboot and/or restart of all jobs executing on the computing environment before availability can be restored.

To address the above shortcomings of virtualized computing environments, other techniques for provisioning computing resources of computing units in a computing environment include directly provisioning specific pieces or portions of the computing hardware of the computing units. For example, one or more cores of a processor and/or a predefined amount of memory may be allocated to execute a specific job. Directly provisioning computing hardware in this way allows for flexible deployment of computing hardware, rendering the specific computing infrastructure composable. Such composable infrastructure may improve job execution speed, because jobs are able to execute directly on the allocated computing hardware without the computing overhead of virtualization techniques. Also, because the jobs execute on specific parts or portions of computing hardware, the computing environment may be less susceptible to crashes. For example, if a computing unit crashes, the only jobs that need to restart may be those executing on the computing unit that crashed. However, because the jobs execute on the computing hardware itself and not on virtualized computing hardware, startup times for the jobs may be longer, as the jobs may have to be configured and installed for the specific types and amount of computing hardware that is allocated. Also, allocating the computer hardware itself is more difficult, as overall system resource utilization needs to be balanced against the actual hardware available on individual computing units.

Therefore, there exists a need to efficiently allocate computing resources in a composable infrastructure computing environment in a way that balances the amount of available computing resources available on individual computing units with fault concerns, such as overall job downtime and startup latency for crashed jobs. One solution to this problem is to collect information regarding latencies in starting jobs that are currently executing on the computing units and to use the latencies in starting the jobs as a measure indicative of the latency required to restart the jobs if necessary. In particular, the latencies may include information on how much time is required to initialize a system before execution of the job begins. The latencies can also include, depending on the type of job, a time required to initialized network communications for the job. The latencies for the jobs may then be combined with other jobs executing on the same computing unit to measure an overall latency of restarting the jobs on a given computing unit, should the computing unit crash or otherwise need to reboot. The overall latencies can then be compared and utilized to select computing units for execution of jobs that are newly-received for execution.

FIG. 1 illustrates a system 100 according to an exemplary embodiment of the present disclosure. The system 100 may be configured to receive requests for executing jobs on multiple computing units. In particular, the system 100 may be configured to allocate computing resources to execute jobs according to a composable infrastructure, as discussed above. The system 100 includes user devices 102, 114, computing units 128, 138, 150, a node manager 162, a network 126, a scheduler service 164, and a metrics service 172. The user devices 102, 114 may be configured to generate job execution requests 104, 116. The job execution requests may include jobs 106, 118 for execution by one or more of the computing units 128, 138, 150. In certain implementations, the job execution requests 104, 116 may further specify a resource constraint 108, 120. The resource constraints 108, 120 may specify a minimum amount of computing resources required to execute the job 106, 118 (e.g., a minimum number of processor cores and/or minimum amount of memory allocated to executing the jobs 106, 118).

The computing units 128, 138, 150 include computing hardware 134, 146, 158 for execution of jobs 130, 132, 140, 142, 144, 152, 154, 156. The computing hardware 134, 146, 158 may include one or more processors and/or memories. A subset of the computing hardware 134, 146, 158 may be allocated hardware 136, 148, 160 for use in executing the jobs 130, 132, 140, 142, 144, 152, 154, 156. The allocated hardware 136, 148, 160 may specify a particular portion of the computing hardware 134, 146, 158 that is assigned to execute each job 130, 132, 140, 142, 144, 152, 154, 156. For example, the allocated hardware 136, 148, 160 may specify particular processing cores and/or particular portions of memories for use in executing each of the jobs 130, 132, 140, 142, 144, 152, 154, 156.

The jobs 130, 132, 140, 142, 144, 152, 154, 156 may include one or more pod processes and service processes. Pod processes may include processes that are less interactive (e.g., performing analytics, updating a database) and do not need a response to the user device 102, 114 requesting execution of the process. Service processes may include processes that are more interactive (e.g., hosting a webservice, performing interactive database queries) and need a greater response and/or network interactivity to properly execute. Accordingly, more robust networking capabilities may need to be initialized for service processes so that the service processes can interact with, e.g., other jobs 130, 132, 140, 142, 144, 152, 154, 156, other computing units 128, 138, 150, and/or the user device 102, 114 that requested execution of the services.

The node manager 162 may be responsible for receiving job execution requests 104, 116 from user devices 102, 114 and for allocating computing hardware 134, 146, 158 for execution of the jobs 106, 118 specified in the received job execution requests 104, 116. For example, in response to receiving the job execution request 104, the node manager 162 may identify, from among the computing hardware 134, 146, 158 of the computing units 128, 138, 150, hardware that has not been allocated that is sufficient to execute the job 106 (e.g., that meets the resource constraint 108).

The metrics service 172 may be responsible for determining one or more metrics (e.g., performance metrics, latency metrics, timing metrics) regarding the computing units 128, 138, 150. For example, as depicted, the metrics service 172 may maintain a job availability time table 174 and a network connection time table 176. The job availability time table 174 may include measurements of the time it took for jobs 130, 132, 140, 142, 144, 152, 154, 156 executing on the computing units 128, 138, 150 to become available after execution began. For example, the metrics service 172 may determine that execution of a job 130, 132, 140, 142, 144, 152, 154, 156 has begun after a computing unit 128 responsible for executing a job 130, 132, 140, 142, 144, 152, 154, 156 indicates that execution has begun and/or after the job 130, 132, 140, 142, 144, 152, 154, 156 transmits a message or alert that execution has begun. The network connection time table 176 may include information regarding the amount of time it took for jobs 130, 132, 140, 142, 144, 152, 154, 156 to establish a network connection after beginning execution on the computing units 128, 138, 150.

The scheduler service 164 may be responsible for determining aggregate latencies for each of the computing units 128, 138, 150. The scheduler service 164 may store the aggregate latencies in an aggregate latency time table 166.

The aggregate latencies for each computing unit 128, 138, 150 may represent a latency time for restarting the jobs 130, 132, 140, 142, 144, 152, 154, 156 executing on the computing unit 128, 138, 150 should the computing unit 128, 138, 150 fail. For example, as depicted, the aggregate latency table 166 indicates an aggregate latency of 500 milliseconds (ms) for the computing unit 128, which may represent the time required to restart the jobs 130, 132 executing on the computing unit 128 should the computing unit 128 fail (e.g., to restart the computing unit 128 and/or to move execution of the jobs 130, 132 to the other computing units 138, 150). In certain implementations, one or both of the scheduler service 164 and the metrics service 172 may be implemented as one or more components (e.g., software components) of the node manager 162.

The network 126 may facilitate communications between user devices 102, 114 and the node manager 162. The network 126 may include one or more local or external network connections (e.g., local network connections, connections over the Internet) between the user device 102, 114 in the node manager 162. The user devices 102, 114 and the node manager 162 may connect to the network 126 using one or more physical and/or wireless interfaces (e.g., Ethernet, Wi-Fi®, Bluetooth®, and/or cellular data interfaces). The computing units 128, 138, 150, the scheduler service 164, and the metrics service 172 may also communicate with the node manager and with one another via a network such as the network 126 and may similarly utilize physical and/or wireless network interfaces.

CPUs 110, 122, 170, 178 and the memories 112, 124, 168, 180 may implement one or more aspects of the user devices 102, 114, the scheduler service 164, and the metrics service 172. For example, the memories 112, 124, 168, 180 may store instructions which, when executed by the CPUs 110, 122, 170, 178, may cause the CPUs 110, 122, 170, 178 to perform one or more of the operational features of the user devices 102, 114. The scheduler service 164, and the metrics service 172. Additionally, although not depicted, the computing units 128, 138, 150 and the node manager 162 may similarly include CPUs and/or memories configured to implement one or more operational features of the computing units 128, 138, 150 and the node manager 162.

Figure 2A:
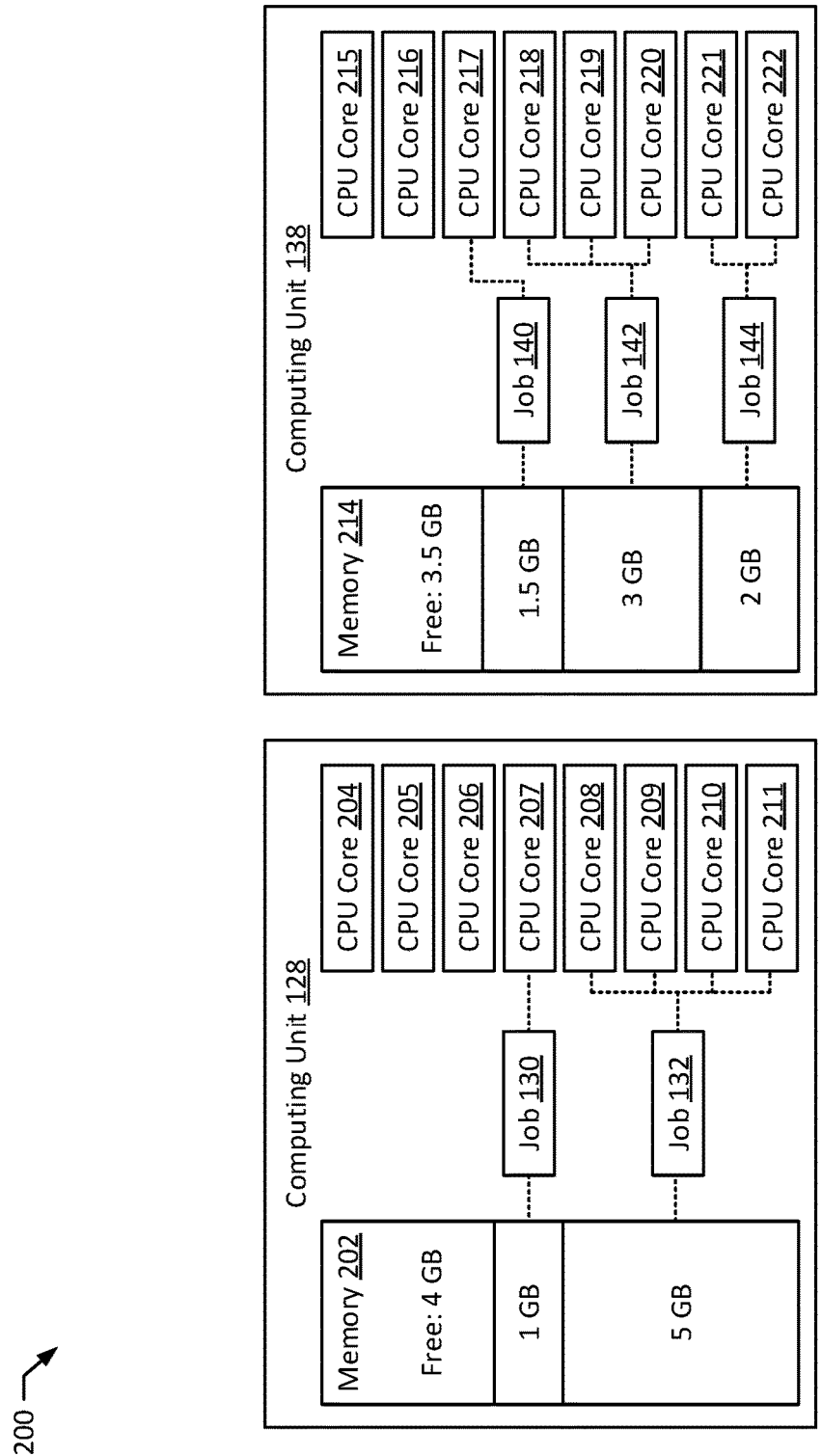
FIGS. 2A-2B illustrate computing resource allocations according to exemplary embodiments of the present disclosure.
Figure 2B:
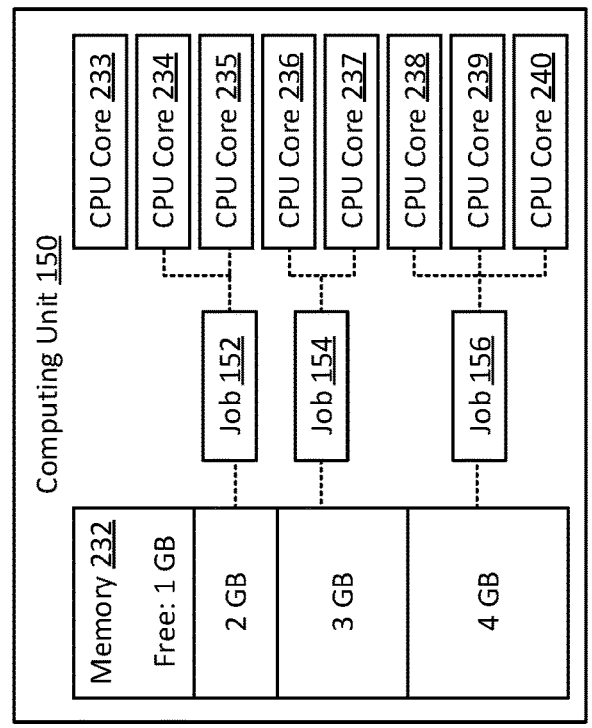

FIGS. 2A-2B illustrate computing resource allocations 200, 230 according to exemplary embodiments of the present disclosure. The computing resource allocations 200, 230 may illustrate exemplary allocations of computing hardware 134, 146, 158 for execution of the jobs 130, 132, 140, 142, 144, 152, 154, 156 by the computing units 128, 138, 150. Computing resource allocation 200 illustrates exemplary allocation of the computing hardware 134, 146 of the computing units 128, 138. The computing units 128, 138 as depicted both include 10 gigabytes (GB) of memory 202, 214 and eight CPU cores 204-211, 215-222. The memories 202, 214 and the CPU cores 207-211, 217-222 are allocated to execution of the jobs 130, 132 by the computing unit 128 and jobs 140, 142, 144 by the computing unit 138. In particular, job 130 is allocated one GB of the memory 202 and one CPU core 207 of the computing unit 128 and job 132 is allocated five GB of memory 202 and four CPU cores 208-211 of the computing units 128. Further, job 140 is allocated 1.5 GB of the memory 214 and one CPU core 217 of the computing units 138, job 142 is allocated three GB of the memory 214 and three CPU cores 218-220 of the computing unit 138, and job 144 is allocated two GB of the memory 214 and two CPU cores 221-222 of the computing unit 138. These allocations leave the computing unit 128 with four GB of the memory 202 and three CPU cores 204-206 available for execution of other jobs (e.g., jobs 106, 118 received via job execution requests 104, 116) and leave the computing unit 138 with 3.5 GB of the memory 214 and two CPU cores 215-216 available for execution of other jobs. The computing resource allocation 230 illustrates an exemplary allocation of the computing hardware 158 of the computing unit 150. As depicted, the computing unit 150 includes 10 GB of memory 232 and eight CPU cores 233-240. In the resource allocation 230, the job 152 is allocated two GB of the memory 232 and two CPU cores 234-235 of the computing unit 150, the job 154 is allocated three GB of the memory 232 and two CPU cores 236-237 of the computing unit 150, and job 156 is allocated four GB of the memory 232 and three CPU cores 238-240 of the computing unit 150. The computing resource allocation 230 leaves the computing unit 150 with one GB of the memory 232 and one CPU core 233 available for execution of other jobs.

FIG. 3 illustrates time tables 300 according to an exemplary embodiment of the present disclosure. The time tables 300 may illustrate exemplary implementations of the job availability time table 174 and the network connection time table 176 of the metrics service 172 (e.g., exemplary job availability times and network communication times for jobs 130, 132, 140, 142, 144, 152, 154, 156 executing on the computing units 128, 138, 150). In the job availability time table 174, the jobs 130, 132 executing on the computing unit 128 have job availability times, respectively, of 50 ms and 300 ms. The jobs 140, 142, 144 executing on the computing unit 138 have, respectively, job availability times of 70 ms, 150 ms, and 100 ms. The jobs 152, 154, 156 executing on the computing unit 150 have job availability times, respectively, of 90 ms, 165 ms, and 200 ms. The job availability time may indicate a time from when initialization of a job 130, 132, 140, 142, 144, 152, 154, 156 begins until the job 130, 132, 140, 142, 144, 152, 154, 156 begins executing. For example, allocation of computing resources in a composable infrastructure computing environment may require initialization of jobs (e.g., installation and initialization of operating systems, libraries, and/or dependencies required to execute jobs) prior to executing the jobs. Accordingly, the job availability time may provide an indication of the time required to initialize jobs before their execution begins. As will be explained further below, the job availability time may further be used in resource allocation decisions for newly-received job execution requests 104, 116 to determine a latency of restarting the jobs 130, 132, 140, 142, 144, 152, 154, 156 of a computing unit 128, 138, 150 upon failure of the computing unit 128, 138, 150.

The network connection time table 176 may provide network connection times for certain jobs 132, 142, 154, 156 executing on the computing units 128, 138, 150. As explained above, certain types of jobs (e.g., service jobs) may require greater responsiveness and may therefore also require initialization of further networking resources prior to beginning execution. For example, as depicted, the jobs 132, 142, 154, 156 may correspond to service jobs that require network service initialization prior to beginning execution. The network connection time table 176 may therefore store network connection times for these jobs 132, 142, 154, 156. For example, the job 132 has a network connection time of 150 ms, the job 142 has a network connection time of 50 ms, the job 154 has a network connection of 85 ms, and the job 156 has a network connection of 70 ms. The network connection times may further be used in resource allocation decisions for newly-received job execution requests 104, 116 to determine a latency of restarting the jobs 132, 142, 154, 156 upon failure of a computing unit 128, 138, 150.

Figure 4:
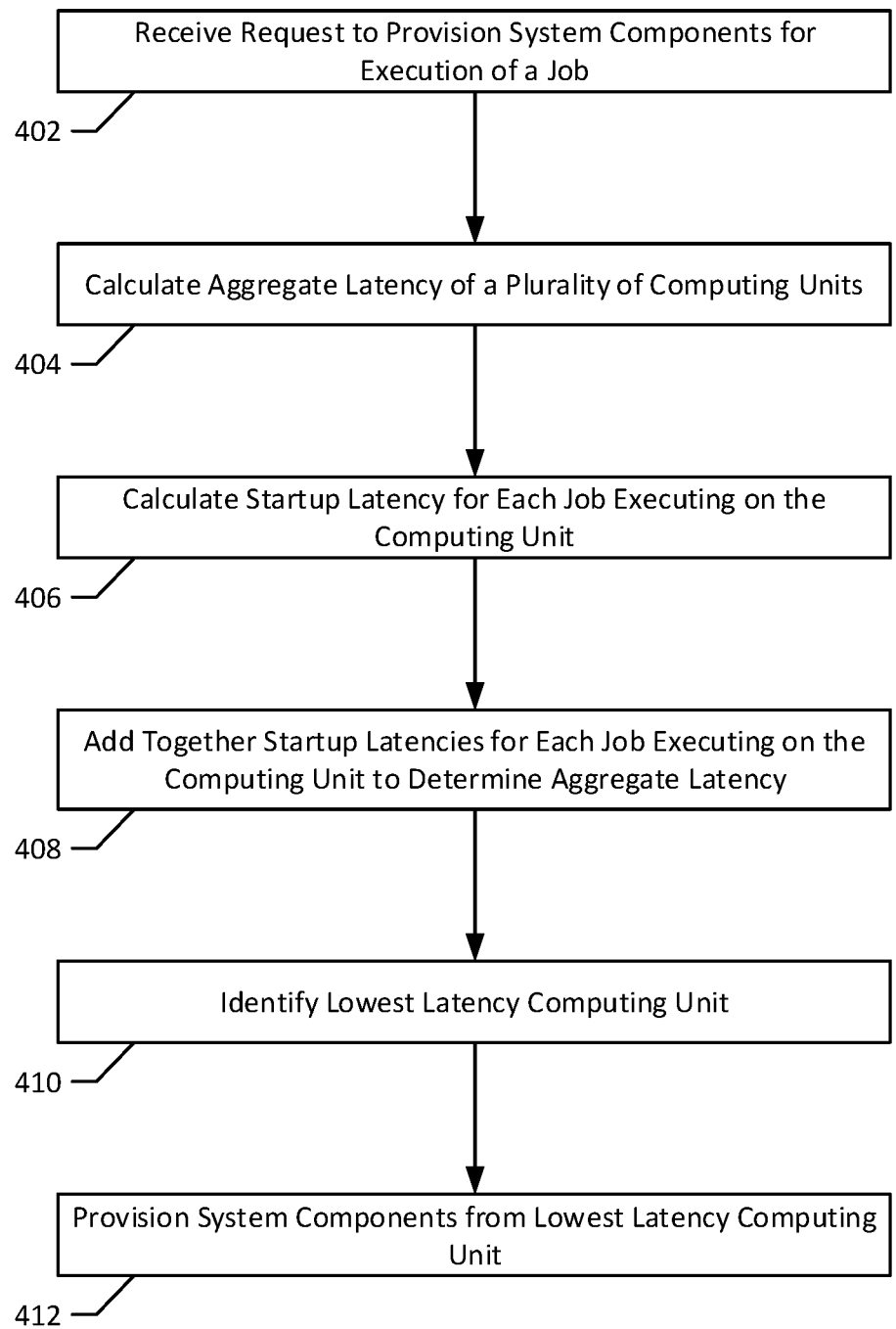
FIG. 4 illustrates a method according to an exemplary embodiment of the present disclosure.

FIG. 4 illustrates a method 400 according to an exemplary embodiment of the present disclosure. The method 400 may be performed to allocate computing hardware 134, 146, 158 to execute jobs 106, 118 in the job execution requests 104, 116. In particular, the method 400 may be performed to balance (i) a latency of restarting jobs executed by the computing units 128, 138, 150 if the computing units 128, 138, 150 fail with (ii) the computing hardware 134, 146, 158 available to execute the jobs 106, 118 of the job execution requests 104, 116. The method 400 may be implemented on a computer system, such as the system 100. For example, the method 400 may be implemented by the node manager 162, the scheduler service 164, and/or the metrics service 172. The method 400 may also be implemented by a set of instructions stored on a computer readable medium that, when executed by a processor, cause the computer system to perform the method. For example, all or part of the method 400 may be implemented by the CPUs 170, 178, the memories 168, 180 and/or a CPU and memory of the node manager 162. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with receiving a request to provision system components for execution of a job (block 402). For example, the node manager 162 and/or scheduler service 164 may receive a job execution request 104, 116 from a user device 102, 114. The job execution request 104, 116 may include a job 106, 118 for which execution is requested. The job execution request 104, 116 may also include resource constraints 108 specifying minimum amounts of computer hardware 134, 146, 158 (e.g., a minimum amount of memory and/or a minimum number of processing cores) to use when executing the job 106, 118). The job execution request 104, 116 may be received from a user device 102, 114 via a network 126.

An aggregate latency may then be calculated for a plurality of computing units (block 404). The aggregate latency may be calculated to determine an overall latency period to restart execution of the jobs executing on a computing unit should the computing unit fail (e.g., crash or otherwise need to be rebooted or restarted). In particular, the aggregate latency may be calculated for each of the plurality of computing units, which may include all or part of the computing units 128, 138, 150 corresponding to a node manager 162 and/or scheduler service 164 that received the request. The aggregate latency may be calculated for each computing unit based on a measure of the time required to begin executing each job on the computing unit. For example, the aggregate latency of the computing unit 128 may be calculated to reflect the time required to begin executing jobs 130, 132 and the aggregate latency of the computing unit 138 may be calculated to reflect the time required to begin executing jobs 140, 142, 144. In certain implementations, the aggregate latency may also be calculated based at least in part on the number of jobs executing on the computing unit.

In particular, to calculate the aggregate latency for a computing unit, a startup latency may be calculated for each job executing on the computing unit (block 406). In particular, for each job 130, 132, 140, 142, 144, 152, 154, 156 executing on a computing unit 128, 138, 150, the node manager may determine the startup latency as the time required from when initialization of the job 130, 132, 140, 142, 144, 152, 154, 156 begins until when the job 130, 132, 140, 142, 144, 152, 154, 156 is available for execution. As explained further above, the initialization may include installing any necessary operating system, library, and/or dependencies required to properly execute the job 130, 132, 140, 142, 144, 152, 154, 156. As different jobs may have different initialization requirements (e.g., different required libraries and/or dependencies), the startup latency may differ for each job. The job availability time may be calculated for each job 130, 132, 140, 142, 144, 152, 154, 156 and may be stored in a job availability time table 174. In particular, the metrics service 172 may calculate the job availability times and may create and store the job availability time table 174. As one example, the time tables 300 indicate, in the job availability time table 174, job availability times for each of the jobs 130, 132, 140, 142, 144, 152, 154, 156.

The startup latencies for each job executing on the computing unit may then be added together to determine the aggregate latency of the computing unit (block 408). For example, the scheduler service 164 may receive the job availability time table 174, or data from the job availability time table 174, and may add together the latencies of the jobs 130, 132, 140, 142, 144, 152, 154, 156 from the job availability time table 174 corresponding to each computing unit 128, 138, 150. In particular, the computing unit 128 is executing job 130, which has a job availability time of 50 ms, and job 132, which has a job availability time of 300 ms. Therefore, the aggregate latency of the computing unit 128 may be calculated as 50 ms+300 ms=350 ms. Also, the computing unit is executing job 140, which has a job availability time of 70 ms, job 142, which has a job availability time of 150 ms, and job 144, which has a job availability time of 100 ms. Therefore, the aggregate latency of the computing unit 138 may be calculated as 70 ms+150 ms+100 ms=320 ms. Similarly, the computing unit 150 is executing job 152, which has a job availability time of 90 ms, job 154, which has a job availability time of 165 ms, and job 156, which has a job availability time of 200 ms. Therefore, the aggregate latency of the computing unit 150 may be calculated as 90 ms+165 ms+200 ms=455 ms. Once calculated, the aggregate latencies of each of the computing units 128, 138, 150 may be stored in an aggregate latency time table 166.

In certain implementations, the job availability times may be weighted according to length before adding the job availability times together. For example, when calculating the aggregate latency, the scheduler service 164 may weight job availability times higher (e.g., 1.5 times higher) if the job availability times exceed a predetermined threshold (e.g., 150 ms). As a specific example, the aggregate latency of the computing unit 128 may be calculated as 50 ms+(1.5*300 ms)=500 ms according to such weights. In certain implementations, job availability times that are longer may correspond to jobs that are of a higher importance, or that are performing more critical or complex tasks. Additionally or alternatively, restarting jobs with longer job availability times may require more computing resources of the computing units 128, 138, 150 (e.g., to initialize the jobs), reducing overall capabilities of the computing units 128, 138, 150 to execute jobs. Accordingly, longer availability times may be weighted higher to account for the greater costs associated with restarting such jobs. Other weighting schemes are also contemplated. For example, rather than utilizing one or more predetermined thresholds, the job availability times may be weighted by weights that increase continuously (e.g., according to an increasing function) according to the length of the job availability time. As a specific example, job availability times may be weighted according to weights that increase linearly with the length of the job availability time and/or weights that increase exponentially with the length of the job availability time.

In still further implementations, calculating the startup latency of a job may further include adding the network connection times for any job with a network connection time in the network connection time table 176. For example, the job 132 executed by the computing unit 128 has a network connection time of 150 ms and a job availability time of 300 ms. The job 132 may therefore be determined to have a startup latency of 150 ms+300 ms=450 ms. The computing unit 128 also executes the job 130 with a job availability time of 50 ms. Therefore, the aggregate latency of the computing unit 128 may be calculated as 50 ms+450 ms=500 ms. Using similar techniques, the aggregate latency of the computing unit 138 may be calculated as 70 ms+150 ms+100 ms+50 ms=370 ms and the aggregate latency of the computing unit 150 may be calculated as 90 ms+165 ms+200 ms+85 ms+70 ms=610 ms. Further details regarding determination of the network connection time are discussed below in connection with FIG. 5.

A lowest latency computing unit may then be identified (block 410). For example, the node manager 162 and/or scheduler service 164 may identify, based on the determined aggregate latencies for each computing unit 128, 138, 150, the lowest latency computing unit as the computing unit 128, 138, 150 with the lowest aggregate latency. As depicted in FIG. 1, the computing unit 128 may have an aggregate latency of 500 ms, the computing unit 138 may have an aggregate latency of 370 ms, and the computing unit 150 may have an aggregate latency of 610 ms. In such an example, the node manager 162 and/or scheduler service 164 may identify the computing unit 138 as the lowest latency computing unit.

In implementations where the job execution request 104, 116 includes a resource constraint 108, 120, the node manager 162 and/or scheduler service 164 may further identify the lowest latency computing unit as the computing unit 128, 138, 150 with the lowest aggregate latency with sufficient available computing resources to meet the resource constraint 108, 120. For example, the resource constraint 108, 120 may specify that the job 106, 118 requires three processor cores and two GB of memory to execute. Although the computing unit 138 may have the lowest aggregate latency of 370 ms in the above example, it may only have two available CPU cores 215-216, as depicted in FIG. 2A. Therefore, the computing unit 138 may not be able to meet the resource constraint 108, 120. However, the computing unit 128 has the next lowest aggregate latency of 500 ms and has three available CPU cores 204-206 and three GB of free memory 202. Therefore, the computing unit 128 may be selected as the lowest latency computing unit.

In still further implementations, the lowest latency computing unit may be identified as the computing unit 128, 138, 150 that satisfies a predetermined failure constraint (e.g., a predetermined failure constraint specified in the job execution request 104, 116 and/or associated with the user device 102, 114). The predetermined failure constraint may specify an acceptable maximum latency-to-runtime ratio for the computing unit to which a job 106, 118 is assigned for execution. For example, the predetermined failure constraint may specify that the aggregate latency of a computing unit 128, 138, 150 may not exceed a certain percentage (e.g., 0.01%, 0.05%, 0.1%, 1%) of the runtime of the computing unit 128, 138, 150 (e.g., the average runtime of the computing unit 128, 138, 150 between reboots or errors, the current runtime of the computing unit 128, 138, 150, and/or the time remaining until a scheduled reboot of the computing unit 128, 138, 150).

System components may then be provisioned from the lowest latency computing unit (block 412). For example, the node manager 162 and/or scheduler service 164 may provision computer hardware 146 (e.g., available processor cores and memory) from the computing unit 138 to execute a job 106, 118 included in the received job execution request. The provisioned computer hardware 146 may then begin initializing and executing the job 106, 118 received in the job execution request 104, 116.

In certain implementations, blocks 404-408 may be performed before receiving the request to provision system components at block 402. For example, the job availability time table 174, the network connection time table 176, and/or the aggregate latency time table 166 may be calculated and prepared at least partially before receiving the request at block 402.

Figure 5:
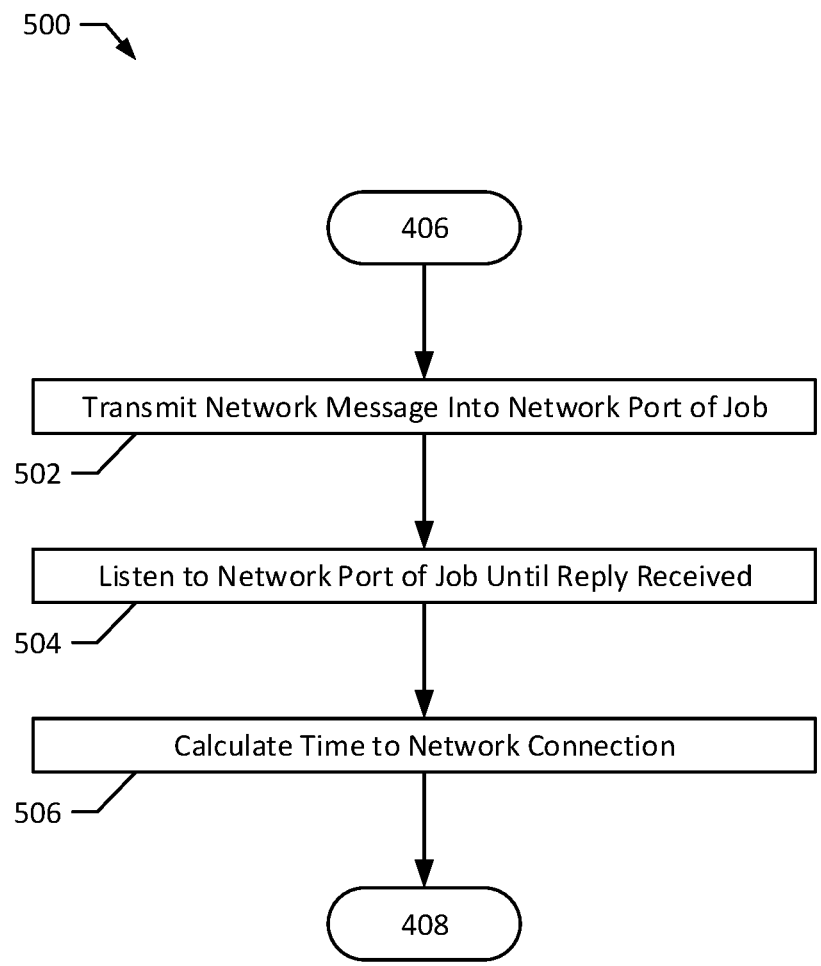
FIG. 5 illustrates a method according to an exemplary embodiment of the present disclosure.

FIG. 5 illustrates a method 500 according to an exemplary embodiment of the present disclosure. The method 500 may be performed to calculate a network connection time for jobs executing on computing units. In particular, the method 500 may be performed during or between blocks 406, 408 of the method 400. The method 500 may be implemented on a computer system, such as the system 100. For example, the method 500 may be implemented by the node manager 162, the scheduler service 164, and/or the metrics service 172. The method 500 may also be implemented by a set of instructions stored on a computer readable medium that, when executed by a processor, cause the computer system to perform the method. For example, all or part of the method 500 may be implemented by the CPUs 170, 178, the memories 168, 180 and/or a CPU and memory of the node manager 162. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method 500 begins with transmitting a network message into a network port of a job (block 502). For example, when initialization begins for a job 130, 132, 140, 142, 144, 152, 154, 156, the metrics service 172 and/or the node manager 162 may transmit a network message into the network port of the job 130, 132, 140, 142, 144, 152, 154, 156. The network message may identify the metrics service 172 and/or the node manager 162 transmitting the network message (e.g., a network address of the metrics service 172 and/or the node manager 162) and may request a reply from the job 130, 132, 140, 142, 144, 152, 154, 156 once received.

The method 500 may continue with listening to the network port of the job until a reply is received (block 504). For example, the metrics service 172 and/or the node manager 162 that transmitted the message to the job 130, 132, 140, 142, 144, 152, 154, 156 may listen to a network port of the job 130, 132, 140, 142, 144, 152, 154, 156 until a reply is received. The job 130, 132, 140, 142, 144, 152, 154, 156 may be unable to receive the message or to send a reply along the network port until networking services for the job 130, 132, 140, 142, 144, 152, 154, 156 are completely initialized. Accordingly, a message may not be received from the network port of the job until the networking services are completely initialized. Therefore, once the reply is received, the metrics service 172 and/or node manager 162 may determine that a network connection is established and that networking services are initialized.

A time to network connection may then be calculated for the job (block 506). For example, the metrics service and/or the node manager 162 may calculate a time to network connection for the job after receiving the reply at block 504. In particular, the time to network connection may be calculated as the time from which the network message was transmitted until the time at which the reply is received along the network port of the job 130, 132, 140, 142, 144, 152, 154, 156. The time to network connection may then be stored in a network connection time table 176 and, as explained previously, may be used to calculate the startup latency for the job.

Figure 6:
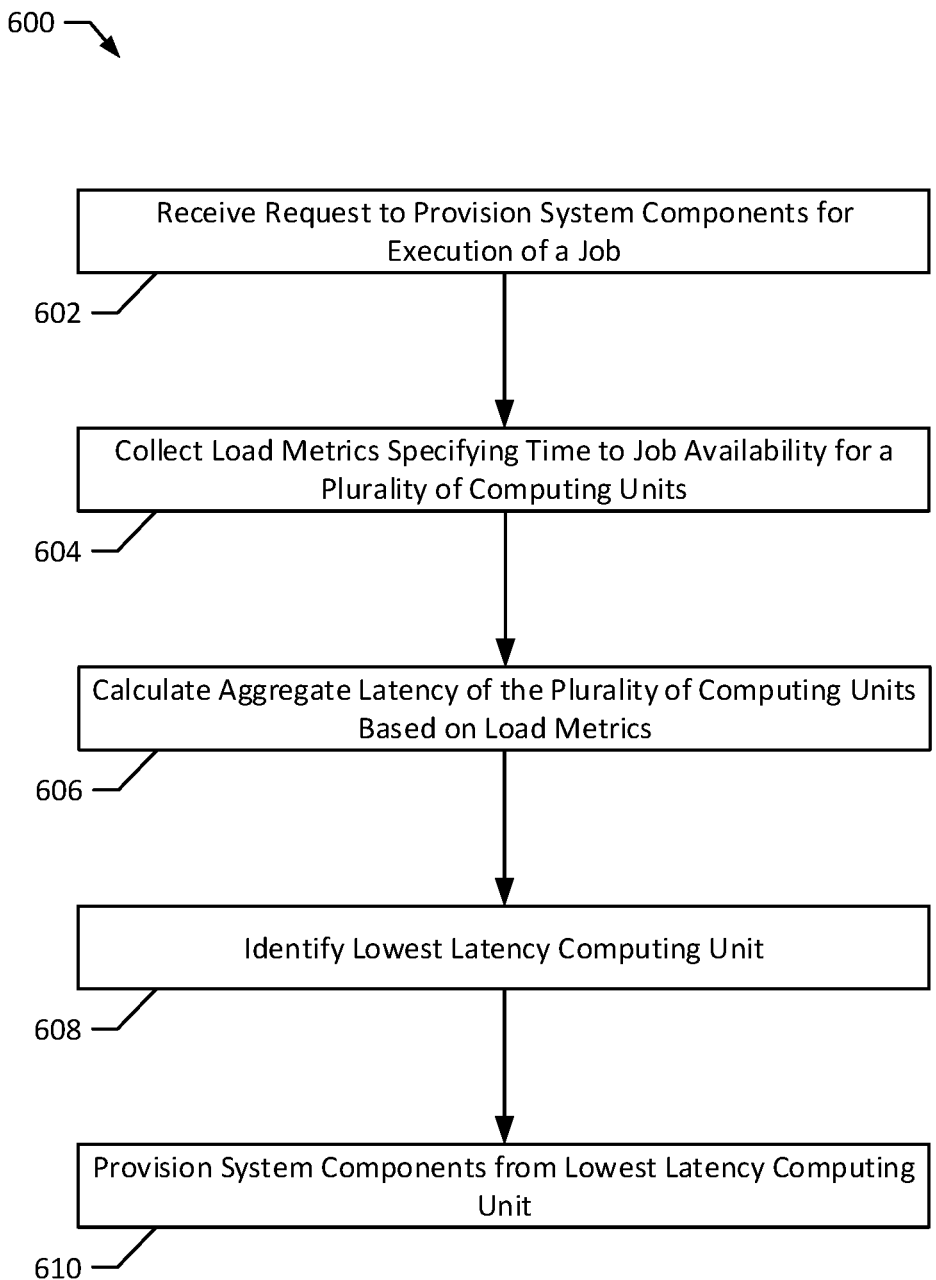
FIG. 6 illustrates a method according to an exemplary embodiment of the present disclosure.

FIG. 6 illustrates a method 600 according to an exemplary embodiment of the present disclosure. The method 600 may be performed to receive and process requests for system resources. In particular, the method 600 may be performed to receive and process job execution requests 104, 116. The method 600 may be implemented on a computer system, such as the system 100. For example, the method 600 may be implemented by the node manager 162, the scheduler service 164, and the metrics service 172. The method 600 may also be implemented by a set of instructions stored on a computer readable medium that, when executed by a processor, cause the computer system to perform the method. For example, all or part of the method 600 may be implemented by the CPUs 170, 178, the memories 168, 180 and/or a CPU and memory of the node manager 162. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with receiving a request to provision system components for execution of a job (block 602). For example, the scheduler service 164 and/or the node manager 162 may receive a job execution request 104 that includes a job 106, 118 and/or a resource constraint 108, 120, as discussed previously.

Load metrics may then be collected that specify a time to job availability for a plurality of computing units (block 604). In particular, the scheduler service 164 and/or the node manager 162 may collect load metrics including a job availability time table 174 that specifies times to job availability for the jobs 130, 132, 140, 142, 144, 152, 154, 156 executed by the computing units 128, 138, 150. In certain implementations, the load metrics may also include a network connection time table 176 specifying network connection times for the jobs 130, 132, 140, 142, 144, 152, 154, 156 executing on the computing units 128, 138, 150. The load metrics may then be used to calculate a startup latency for the jobs 130, 132, 140, 142, 144, 152, 154, 156. For example, the startup latency may be calculated for each job 130, 132, 140, 142, 144, 152, 154, 156 to include one or both of the job availability time and the network connection time for the job 130, 132, 140, 142, 144, 152, 154, 156.

An aggregate latency may then be calculated for the computing units based on the load metrics (block 606). For example, an aggregate latency may be calculated for individual computing units (e.g., for each computing unit of a least a subset of the plurality of computing units). As explained previously, the aggregate latency may be calculated by adding together, for a given computing unit 128, 138, 150, the startup latencies for the jobs 130, 132, 140, 142, 144, 152, 154, 156 executing on the computing unit 128, 138, 150.

A lowest latency computing unit may then be identified (block 608) and system components may be provisioned from the lowest latency computing unit (block 610). These blocks 608, 610 may be performed using techniques similar to those discussed above in connection with blocks 410, 412.

Figure 7:
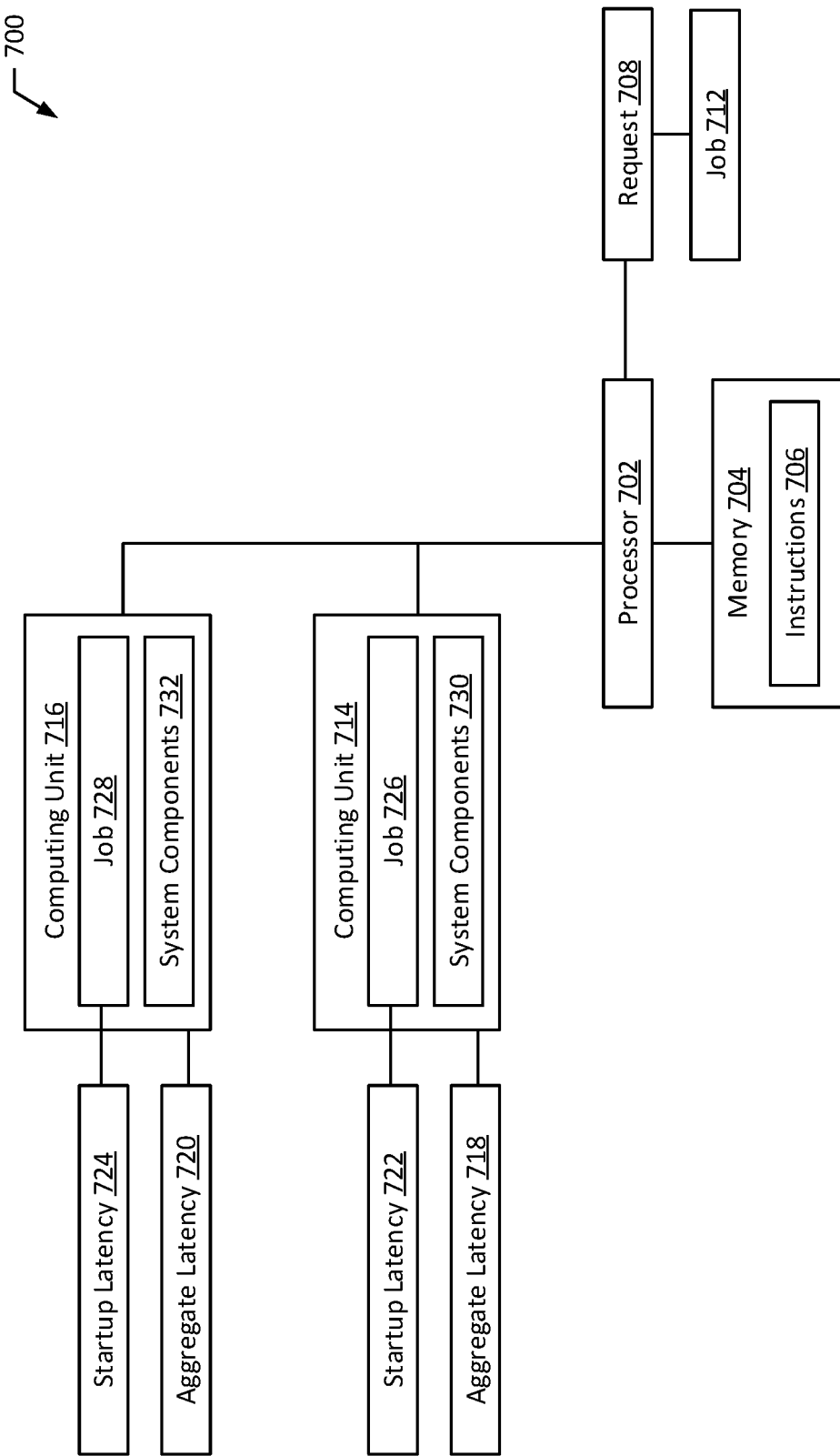
FIG. 7 illustrates a system according to an exemplary embodiment of the present disclosure.

FIG. 7 illustrates a system 700 according to an exemplary embodiment of the present disclosure. The system 700 includes a processor 702 and a memory 704. The memory 704 stores instructions 706 which, when executed by the processor 702, cause the processor 702 to receive a request 708 to provision one or more system components 730, 732 for execution of a job 712 and calculate an aggregate latency 718, 720 of a plurality of computing units 714, 716. To calculate the aggregate latency 718, 720 for each computing unit 714, 716, of the plurality of computing units 714, 716, the processor 702 calculates a startup latency 722, 724 for each job 726, 728 executing on the computing unit 714, 716 and adds together the startup latency 722, 724 for each job 726, 728 executing on the computing unit 714, 716 to determine the aggregate latency 718, 720 of the computing unit, 714, 716. The instructions 706, when executed by the processor 702, may further cause the processor 702 to identify a computing unit 714, 716 with the lowest aggregate latency 718, 720 from among the plurality of computing units 714, 716 and provision system components 730, 732 from the computing unit 714, 716 with the lowest aggregate latency 718, 720.

Aspects of the subject matter described herein may be useful alone or in combination with one or more aspects described herein. In a first aspect of the present disclosure, a method is provided that includes receiving a request to provision one or more system components for execution of a job and calculating an aggregate latency of a plurality of computing units. To calculate the aggregate latency for each computing unit of the plurality of computing units, the method includes calculating a startup latency for each job executing on the computing unit and adding together the startup latencies for each job executing on the computing unit to determine the aggregate latency of the computing unit. The method also include identifying a computing unit with the lowest aggregate latency from among the plurality of computing units and provisioning system components from the computing unit with the lowest aggregate latency.

In a second aspect according to any of the previous aspects (e.g., the first aspect), calculating the aggregate latency of the plurality of computing units further includes receiving load metrics specifying at least a time to job availability for each job executing on the computing unit.

In a third aspect according to any of the previous aspects (e.g., the second aspect), the startup latency for each job executing on the computing unit includes the time to job availability from the load metrics.

In a fourth aspect according to any of the previous aspects (e.g., the third aspect), the startup latency for at least one job executing on the computing unit further includes a time to network connection.

In a fifth aspect according to any of the previous aspects (e.g., the fourth aspect), the time to network connection is determined by transmitting a network message into a network port of the job, listening to the network port of the job until a reply is received, and calculating the time to network connection as the time from when the network message is transmitter until the reply is received.

In a sixth aspect according to any of the previous aspects (e.g., the first aspect), calculating the aggregate latency of the plurality of computing units further includes weighting, prior to adding together the startup latencies for each job executing on the computing unit, the startup latency for each job executing on the computing unit with a weight that varies according to a duration of the startup latency.

In a seventh aspect according to any of the previous aspects (e.g., the sixth aspect), the weight increases linearly according to the duration of the startup latency.

In an eighth aspect according to any of the previous aspects (e.g., the sixth aspect), the weight increases exponentially according to the duration of the startup latency.

In a ninth aspect according to any of the previous aspects (e.g., the first aspect), identifying the computing unit with the lowest aggregate latency further includes identifying the computing unit with the lowest aggregate latency that satisfies a resource constraint included in the request. The resource constraint may specify a minimum amount of system components for execution of the job.

In a tenth aspect, identifying the computing unit with the lowest aggregate latency further includes identifying the computing unit with the lowest aggregate latency that satisfies a predetermined failure constraint specifying an acceptable maximum latency-to-runtime ratio for the plurality of computing units.

In an eleventh aspect according to any of the previous aspects (e.g., the first aspect), the job includes one or both of (i) a pod process and (ii) a service process.

In a twelfth aspect, a system is provided including a processor and a memory. The memory stores instructions which, when executed by the processor, cause the processor to receive a request to provision one or more system components for execution of a job calculate an aggregate latency of a plurality of computing units. To calculate the aggregate latency for each computing unit of the plurality of computing units, the processor may calculate a startup latency for each job executing on the computing unit and add together the startup latency for each job executing on the computing unit to determine the aggregate latency of the computing unit. The memory stores further instructions which, when executed by the processor, cause the processor to identify a computing unit with the lowest aggregate latency from among the plurality of computing units and provision system components from the computing unit with the lowest aggregate latency.

In a thirteenth aspect according to any of the previous aspects (e.g., the twelfth aspect), the memory contains further instructions which, when executed by the processor, cause the processor to receive load metrics specifying at least a time to job availability for each job executing on the computing unit. The startup latency for each job executing on the computing unit also includes the time to job availability from the load metrics.

In a fourteenth aspect according to any of the previous aspects (e.g., the thirteenth aspect), the startup latency for at least one job executing on the computing unit further includes a time to network connection.

In a fifteenth aspect according to any of the previous aspects (e.g., the fourteenth aspect), the memory contains further instructions which, when executed by the processor while determining the time to network connection, cause the processor to transmit a network message into a network port of the job, listen to the network port of the job until a reply is received, and calculate the time to network connection as the time from when the network message is transmitted until the reply is received.

In a sixteenth aspect according to any of the previous aspects (e.g., the twelfth aspect), the memory contains further instructions which, when executed by the processor while calculating the aggregate latency of the plurality of computing units, cause the processor to weight, prior to adding together the startup latencies for each job executing on the computing unit, the startup latency for each job executing on the computing unit with a weight that varies according to a duration of the startup latency.

In a seventeenth aspect according to any of the previous aspects (e.g., the sixteenth aspect), (i) the weight increases linearly according to the duration of the startup latency and/or (ii) the weight increases exponentially according to the duration of the startup latency.

In an eighteenth aspect according to any of the previous aspects (e.g., the twelfth aspect), the memory contains further instructions which, when executed by the processor while identifying the computing unit with the lowest aggregate latency, cause the processor to identify the computing unit with the lowest aggregate latency that satisfies a resource constraint included in the request. The resource constraint may specify a minimum amount of system components for execution of the job.

In a nineteenth aspect according to any of the previous aspects (e.g., the twelfth aspect), the memory contains further instructions which, when executed by the processor while identifying the computing unit with the lowest aggregate latency, cause the processor to identify the computing unit with the lowest aggregate latency that satisfies a predetermined failure constraint specifying an acceptable maximum latency-to-runtime ratio for the plurality of computing units.

In a twentieth aspect, a non-transitory, computer-readable medium is provided storing instructions which, when executed by a processor, cause the processor to receive a request to provision one or more system components for execution of a job and calculate an aggregate latency of a plurality of computing units. Calculating the aggregate latency for each of the plurality of computing units may include calculating a startup latency for each job executing on the computing unit and adding together the startup latency for each job executing on the computing unit to determine the aggregate latency of the computing unit. The non-transitory, computer-readable medium stores further instructions which, when executed by the processor, cause the processor to identify a computing unit with the lowest aggregate latency from among the plurality of computing units and provision system components from the computing unit with the lowest aggregate latency.

In a twenty-first aspect, a system is provided including a plurality of computing means configured to execute jobs and an aggregate latency determination means configured to calculate an aggregate latency of the plurality of computing units. The aggregate latency determination means may calculate the aggregate latency for each computing unit of the plurality of computing units by calculating a startup latency for each job executing on the computing unit and adding together the startup latency for each job executing on the computing unit to determine the aggregate latency of the computing unit. The system may also include a scheduling means configured to receive a request to provision one or more system components for execution of a job, identify a computing unit with the lowest aggregate latency from among the plurality of computing units, and provision system components from the computing unit with the lowest aggregate latency.

In a twenty-second aspect, a system is provided including a plurality of computing units including system resources and a scheduler service configured to receive a request to provision system resources from one of the plurality of computing units to execute a job. The system may also include a metrics service configured to collect load metrics specifying at least a time to job availability for jobs executing on the plurality of computing units and transmit the load metrics to the scheduler service. The scheduler service is further configured to receive the load metrics from the metrics service, calculate an aggregate latency of the plurality of computing units based on the load metrics. The scheduler service may be still further configured to identify a computing unit with the lowest aggregate latency from among the plurality of computing units and provision system components from the computing unit with the lowest aggregate latency.

In a twenty-third aspect according to any of the previous aspects (e.g., the twenty-second aspect), the scheduler service is further configured, when calculating the aggregate latency of the plurality of computing units, to calculate a startup latency for each job executing on the computing unit and add together the startup latency for each job executing on the computing unit to determine the aggregate latency.

In a twenty-fourth aspect according to any of the previous aspects (e.g., the twenty-third aspect), the startup latency for each job executing on the computing unit includes the time to job availability from the load metrics.

In a twenty-fifth aspect according to any of the previous aspects (e.g., the twenty-fourth aspect), the startup latency for at least one of the jobs executing on the computing unit further includes a time to network connection.

In twenty-sixth aspect according to any of the previous aspects (e.g., the twenty-fifth aspect), the scheduler service is further configured, when determining the time to network connection, to transmit a network message into a network port of the job, listen to the network port of the job until a reply is received, and calculate the time to network connection as the time from when the network message is transmitted until the reply is received.

In twenty-seventh aspect according to any of the previous aspects (e.g., the twenty-third aspect), the scheduler service is further configured, when calculating the aggregate latency of the plurality of computing units, to weight, prior to adding together the startup latency for each job, the startup latency for each job executing on the computing unit with a weight that varies according to a duration of the startup latency.

In a twenty-eighth aspect according to any of the previous aspects (e.g., the twenty-seventh aspect), the weight increases linearly according to the duration of the startup latency.

In a twenty-ninth aspect according to any of the previous aspects (e.g., the twenty-seventh aspect), the weight increases exponentially according to the duration of the startup latency.

In a thirtieth aspect according to any of the previous aspects (e.g., the twenty-second aspect), the scheduler service is further configured, when identifying the computing unit with the lowest aggregate latency, to identify the computing unit with the lowest aggregate latency that satisfies a resource constraint included in the request. The resource constraint may specify a minimum amount of system components for execution of the job.

In a thirty-first aspect according to any of the previous aspects (e.g., the twenty-second aspect), the scheduler service is further configured, when identifying a computing unit with the lowest aggregate latency, to identify the computing unit with the lowest aggregate latency that satisfies a predetermined failure constraint specifying an acceptable maximum latency-to-runtime ratio for the plurality of computing units.

In a thirty-second aspect according to any of the previous aspects (e.g., the twenty-second aspect), the job includes one or both of (i) a pod process and (ii) a service process.

In a thirty-third aspect, a method is provided including receiving a request to provision system resources for execution of a job and collecting load metrics specifying at least a time to job availability for jobs executing on a plurality of computing units. The method may further include calculating an aggregate latency of the plurality of computing units based on the load metrics, identifying a computing unit with the lowest aggregate latency from among the plurality of computing units, and provisioning system components from the computing unit with the lowest aggregate latency.

In a thirty-fourth aspect according to any of the previous aspects (e.g., the thirty-third aspect), calculating the aggregate latency of the plurality of computing units further includes calculating a startup latency for each job executing on the computing unit and adding together the startup latency for each job executing on the computing unit to determine the aggregate latency.

In a thirty-fifth aspect according to any of the previous aspects (e.g., the thirty-fourth aspect), the startup latency for each job executing on the computing unit includes the time to job availability from the load metrics.

In a thirty-sixth aspect according to any of the previous aspects (e.g., the thirty-fifth aspect), the startup latency for at least one of the jobs executing on the computing unit further includes a time to network connection.

In a thirty-seventh aspect according to any of the previous aspects (e.g., the thirty-sixth aspect), the time to network connection is determined by transmitting a network message into a network port of the job, listening to the network port of the job until a reply is received, and calculating the time to network connection as the time from when the network message is transmitted until the reply is received.

In a thirty-eighth aspect according to any of the previous aspects (e.g., the thirty-fourth aspect), calculating the aggregate latency of the plurality of computing units further includes weighting, prior to adding together the startup latency for each job, the startup latency for each job executing on the computing unit with a weight that varies according to a duration of the startup latency.

In a thirty-ninth aspect according to any of the previous aspects (e.g., the thirty-eighth aspect), the weight increases linearly according to the duration of the startup latency.

In a fortieth aspect according to any of the previous aspects (e.g., the thirty-eighth aspect), the weight increases exponentially according to the duration of the startup latency.

In forty-first aspect according to any of the previous aspects (e.g., the thirty-third aspect), identifying a computing unit with the lowest aggregate latency further includes identifying the computing unit with the lowest aggregate latency that satisfies a predetermined resource constraint included in the request specifying a minimum amount of system components for execution of the job.

In forty-second aspect according to any of the previous aspects (e.g., the thirty-third aspect), identifying a computing unit with the lowest aggregate latency further includes identifying the computing unit with the lowest aggregate latency that satisfies a predetermined failure constraint specifying an acceptable maximum latency-to-runtime ratio for the plurality of computing units.

In a forty-third aspect, a non-transitory, computer-readable medium is provided storing instructions which, when executed by a processor, cause the processor to receive a request to provision system resources for execution of a job and collect load metrics specifying at least a time to job availability for jobs executing on a plurality of computing units. The non-transitory, computer-readable medium stores further instructions which, when executed by the processor, cause the processor to calculate an aggregate latency of the plurality of computing units based on the load metrics, identify a computing unit with the lowest aggregate latency from among the plurality of computing units, and provision system components from the computing unit with the lowest aggregate latency.

In a forty-fourth aspect, a system is provided including a plurality of computing means including system resources and a scheduling means configured to receive a request to provision system resources from one of the plurality of computing units to execute a job. The system further includes a metric collection means configured to collect load metrics specifying at least a time to job availability for jobs executing on the plurality of computing units and transmit the load metrics to the scheduling means. The scheduling means are further configured to receive the load metrics from the metric collection means, calculate an aggregate latency of the plurality of computing units based on the load metrics, identify a computing unit with the lowest aggregate latency from among the plurality of computing units, and provision system components from the computing unit with the lowest aggregate latency.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving a request to provision one or more system components for execution of a job;
calculating an aggregate latency of a plurality of computing units by, for each computing unit of the plurality of computing units:
calculating a startup latency for each job executing on the computing unit; and
adding together the startup latencies for each job executing on the computing unit to determine the aggregate latency of the computing unit;
identifying a computing unit with the lowest aggregate latency from among the plurality of computing units; and
provisioning system components from the computing unit with the lowest aggregate latency.

2. The method of claim 1, wherein calculating the aggregate latency of the plurality of computing units further comprises:
receiving load metrics specifying at least a time to job availability for each job executing on the computing unit.

3. The method of claim 2, wherein the startup latency for each job executing on the computing unit includes the time to job availability from the load metrics.

4. The method of claim 3, wherein the startup latency for at least one job executing on the computing unit further includes a time to network connection.

5. The method of claim 4, wherein the time to network connection is determined by:
transmitting a network message into a network port of the job;
listening to the network port of the job until a reply is received; and
calculating the time to network connection as the time from when the network message is transmitted until the reply is received.

6. The method of claim 1, wherein calculating the aggregate latency of the plurality of computing units further comprises:
weighting, prior to adding together the startup latency for each job executing on the computing unit, the startup latency for each job executing on the computing unit with a weight that varies according to a duration of the startup latency.

7. The method of claim 6, wherein the weight increases linearly according to the duration of the startup latency.

8. The method of claim 6, wherein the weight increases exponentially according to the duration of the startup latency.

9. The method of claim 1, wherein identifying the computing unit with the lowest aggregate latency further comprises identifying the computing unit with the lowest aggregate latency that satisfies a resource constraint included in the request, wherein the resource constraint specifies a minimum amount of system components for execution of the job.

10. The method of claim 1, wherein identifying the computing unit with the lowest aggregate latency further comprises identifying the computing unit with the lowest aggregate latency that satisfies a predetermined failure constraint specifying an acceptable maximum latency-to-runtime ratio for the plurality of computing units.

11. The method of claim 1, wherein the job includes one or both of (i) a pod process and (ii) a service process.

12. A system comprising:
a processor; and
a memory storing instructions which, when executed by the processor, cause the processor to:
receive a request to provision one or more system components for execution of a job;

calculate an aggregate latency of a plurality of computing units by, for each computing unit of the plurality of computing units:
  calculating a startup latency for each job executing on the computing unit; and
  adding together the startup latency for each job executing on the computing unit to determine the aggregate latency of the computing unit;
identify a computing unit with the lowest aggregate latency from among the plurality of computing units; and
provision system components from the computing unit with the lowest aggregate latency.

13. A method comprising:
receiving a request to provision system resources for execution of a job;
collecting load metrics specifying at least a time to job availability for jobs executing on a plurality of computing units;
calculating an aggregate latency of the plurality of computing units based on the load metrics;
identifying a lowest latency computing unit with the lowest aggregate latency from among the plurality of computing units; and
provisioning system components from the lowest latency computing unit.

14. The method of claim 13, wherein calculating the aggregate latency of the plurality of computing units further comprises:
calculating a startup latency for each job executing on the computing unit; and
adding together the startup latency for each job executing on the computing unit to determine the aggregate latency.

15. The method of claim 14, wherein the startup latency for each job executing on the computing unit includes the time to job availability from the load metrics.

16. The method of claim 15, wherein the startup latency for at least one of the jobs executing on the computing unit further includes a time to network connection.

17. The method of claim 16, wherein the time to network connection is determined by:
transmitting a network message into a network port of the job;
listening to the network port of the job until a reply is received; and
calculating the time to network connection as the time from when the network message is transmitted until the reply is received.

18. The method of claim 14, wherein calculating the aggregate latency of the plurality of computing units further comprises:
weighting the startup latency for each job executing on the computing unit with a weight that varies according to a duration of the startup latency.

19. The method of claim 18, wherein the weight increases according to one or both of (i) linearly according to the duration of the startup latency and (ii) exponentially according to the duration of the startup latency.

20. The method of claim 13, wherein identifying a lowest latency computing unit further comprises identifying the lowest latency computing unit that satisfies one or both of (i) a predetermined resource constraint included in the request specifying a minimum amount of system components for execution of the job and (ii) a predetermined failure constraint specifying an acceptable maximum latency-to-runtime ratio for the plurality of computing units.

* * * * *